US007946211B1

(12) United States Patent
Winchester et al.

(10) Patent No.: US 7,946,211 B1
(45) Date of Patent: May 24, 2011

(54) ELECTRICAL AND ELASTOMERIC DISRUPTION OF HIGH-VELOCITY PROJECTILES

(75) Inventors: Clinton S. Winchester, Rockville, MD (US); Philip J. Dudt, Rockville, MD (US); Hampton M. DeJarnette, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 518 days.

(21) Appl. No.: 12/220,396

(22) Filed: Jun. 25, 2008

Related U.S. Application Data

(63) Continuation-in-part of application No. 11/443,845, filed on May 22, 2006, now Pat. No. 7,794,808, which is a continuation-in-part of application No. 10/864,317, filed on Jun. 10, 2004, now Pat. No. 7,300,893.

(60) Provisional application No. 60/564,584, filed on Apr. 23, 2004.

(51) Int. Cl.
*F41H 5/00* (2006.01)
*F41H 11/00* (2006.01)
(52) U.S. Cl. .......................................... 89/36.17; 89/902
(58) Field of Classification Search .................. 89/36.01, 89/36.04, 36.17
See application file for complete search history.

(56) References Cited

U.S. PATENT DOCUMENTS

| | | | |
|---|---|---|---|
| 5,540,156 A | 7/1996 | Fong | |
| 5,990,218 A | 11/1999 | Hill et al. | |
| 6,228,933 B1 | 5/2001 | Hiles | |
| 6,622,608 B1 * | 9/2003 | Faul et al. | 89/36.17 |
| 6,782,790 B2 | 8/2004 | Barrett | |
| 6,946,511 B2 | 9/2005 | Iwamoto et al. | |
| 7,104,178 B1 * | 9/2006 | Zank | 89/36.17 |
| 7,114,764 B1 | 10/2006 | Barsoum et al. | |
| 7,300,893 B2 | 11/2007 | Barsoum et al. | |
| 7,658,139 B2 * | 2/2010 | Helander | 89/36.17 |
| 7,661,350 B2 * | 2/2010 | Bouet | 89/36.02 |
| 7,794,808 B2 * | 9/2010 | Dudt et al. | 428/36.9 |
| 2004/0118273 A1 * | 6/2004 | Zank | 89/36.17 |
| 2007/0093158 A1 | 4/2007 | Dudt et al. | |

(Continued)

OTHER PUBLICATIONS

U.S. Appl. No. 60/564,584, filed Apr. 23, 2004, entitled "Armor Including a Strain Rate Hardening Elastomer," joint inventors Roshdy George S. Barsoum and Philip Dudt.

(Continued)

*Primary Examiner* — Bret Hayes
*Assistant Examiner* — Reginald Tillman, Jr.
(74) *Attorney, Agent, or Firm* — Howard Kaiser

(57) ABSTRACT

According to typical inventive practice, an armor structure includes $n \geq 1$ highly-rate-sensitive elastomeric layers and $n+1 \geq 2$ metallic layers, alternately configured. Each metallic layer is electrically connected to a power supply that includes, e.g., battery(ies) and/or supercapacitor(s). Each adjacent pair of metallic layers sandwiches a highly-rate-sensitive elastomeric layer and forms, with the power supply, an uncompleted electrical circuit. A high-velocity projectile that penetratively encroaches upon a highly-rate-sensitive elastomeric layer is subjected to electrical current by virtue of completion of the uncompleted circuit that includes the two sandwiching metallic layers. The circuit is completed by physical (and hence, electrical) contact, bridging the two sandwiching metallic layers, of the projectile and/or its plasma sheath (which at least partially surrounds the projectile's outside surface due to friction between the projectile and the highly-rate-sensitive elastomeric layer). The highly-rate-sensitive elastomeric layer's projectile-hindering mechanical influence temporally lengthens the projectile-hindering electrical influence.

20 Claims, 16 Drawing Sheets

U.S. PATENT DOCUMENTS

2007/0111621 A1   5/2007   Barsoum et al.

OTHER PUBLICATIONS

Co-pending U.S. Appl. No. 11/443,845, filed May 22, 2006, entitled "Elastomeric Damage-Control Barrier," joint inventors Philip John Dudt and Roshdy George S. Barsoum, U.S. Patent Application Publication 2007/0093158 A1, published Apr. 26, 2007.

Ping Zheng et al., "Research on the Passive Electromagnetic Armor," *IEEE Transactions on Magnetics*, vol. 41, No. 1, Jan. 2005, pp. 456-459.

Charles R. Hummer, "Inductance of Parallel Plates in Electromagnetic Armor," Army Research Laboratory, report No. ARL-TR-3788, report date May 2006 (36 pages).

\* cited by examiner

ELECTRICAL AND ELASTOMERIC DISRUPTION OF HIGH-VELOCITY PROJECTILES

CROSS-REFERENCE TO RELATED APPLICATIONS

This application is a continuation-in-part of U.S. nonprovisional application Ser. No. 11/443,845, filed 22 May 2006 now U.S. Pat. No. 7,794,808, hereby incorporated herein by reference, entitled "Elastomeric Damage-Control Barrier," joint inventors Philip John Dudt and Roshdy George S. Barsoum, U.S. Patent Application Publication 2007/0093158 A1, published 26 Apr. 2007, which is a continuation-in-part of U.S. nonprovisional application Ser. No. 10/864,317, filed 10 Jun. 2004, now U.S. Pat. No. 7,300,893 B2, issued 27 Nov. 2007, hereby incorporated herein by reference, entitled "Armor Including a Strain Rate Hardening Elastomer," joint inventors Roshdy George S. Barsoum and Philip Dudt, U.S. Patent Application Publication 2007/0111621 A1, published 17 May 2007, which claims the benefit of U.S. provisional application No. 60/564,584, filed 23 Apr. 2004, hereby incorporated herein by reference, entitled "Armor Including a Strain Rate Hardening Elastomer," joint inventors Roshdy George S. Barsoum and Philip Dudt.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to methods, devices, systems, structures, and materials for protecting entities from physical harm, more particularly to armor protection of persons or things from injury or damage caused by explosive or ballistic events.

Thick and heavy metallic armor, such as made of steel, is capable of defeating high-velocity projectiles, but is not feasible for many applications. For instance, it may be practical to equip a 110-ton tank, but not a 30-ton truck, with thick and heavy metallic armor. The drawbacks of massive solid-metallic/all-metallic armor—e.g., increase in vehicular weight, decrease in vehicular range, decrease in vehicular speed, decrease in mean time between vehicular repairs, and decrease in vehicular lifetime—are especially manifest for applications involving smaller, lighter vehicles such as trucks, high mobility multipurpose wheeled vehicles (HMMWVs, popularly referred to as HUMVEE®s), and other mobile land vehicles.

The term "metallic" as used herein broadly refers to any metal-inclusive homogeneous material, such as an elemental metal or a metal alloy. Armor systems have been considered that utilize non-metallic (e.g., polymeric or ceramic) materials that are lighter than metallic armor materials, but these armor systems can be expensive and are not entirely satisfactory in defending against high-velocity projectiles such as explosively formed projectiles (EFPs), which are designed to hurl fragments at high velocities upon detonation of an explosive. It remains desirable in the art to devise an armor system that is relatively inexpensive, that is suitable for smaller/lighter vehicles, and that more effectively protects the occupants of the vehicles from harm caused by high-velocity projectiles.

SUMMARY OF THE INVENTION

In view of the foregoing, an object of the present invention is to provide a reasonably economical armor system suitable for mobility-purposed vehicles that affords greater protection of vehicular occupants from high-velocity projectiles.

As typically embodied, the present invention's armor system comprises a first rigid electrically conductive plate, a second rigid electrically conductive plate, an elastomeric layer between the first plate and the second plate, and an electrical power supply. The electrical power supply is electrically connected to the first plate and the second plate so as to form an electrical circuit that is open between the first plate and the second plate. Electrification is effected, upon closure of the electrical circuit, of a moving projectile that penetrates the first plate so that at least a portion of the projectile is situated in the elastomeric layer. The closure of the electrical circuit is effected upon establishment, between the first plate and the second plate, of electrical connectivity via either the projectile, or the plasma sheath, or both the projectile and the plasma sheath. The plasma sheath at least partially envelops the projectile and is thermally generated in the elastomeric layer in association with friction of the elastomeric layer with respect to the at least a portion of the projectile that is situated in the elastomeric layer. The electrification of the projectile is sustained while either the projectile, or the plasma sheath, or both the projectile and the plasma sheath, is/are in contact with each of the first plate and the second plate. The first plate and the second plate each at least substantially consist of a metallic material. The strain-rate-sensitivity-hardening elastomeric layer at least substantially consists of a polymeric material such as polyurethane, or polyurea, or a mixture of polyurea and polyurethane. The strain-rate-sensitivity-hardening elastomeric layer affects the projectile by causing decrease in the projectile's speed and/or change of the projectile's direction and/or degradation of the projectile. This affecting of the projectile by the strain-rate-sensitivity-hardening elastomeric layer increases the time during which the at least a portion of the projectile is situated between the first plate and the second plate, thereby increasing the time during which the closure of the electrical circuit is effected. In the time during which the closure of the electrical circuit is effected, the electrification and the strain-rate-sensitivity-hardening elastomeric layer each affect the projectile by causing decrease in the projectile's speed and/or change of the projectile's direction and/or degradation of the projectile.

According to typical inventive practice, the present invention succeeds in defeating high-velocity projectiles; in doing so, the present invention uniquely features the use of highly rate-sensitive (strain-rate-sensitivity-hardening) elastomeric material in combination with the effectuation of electrical discharge (e.g., capacitive discharge or battery discharge at comparatively low energy levels) by rigid electrically conductive plates. The present invention, as typically embodied, is characterized by a synergy of the strain-rate-sensitivity-hardening elastomer and the rigid electrically conductive plates that sandwich it. The two main projectile-disruptive components of the inventive armor system are a mechanical component and an electrical component. The plates facilitate the strain-rate-sensitivity hardening of the elastomer, the elastomer facilitates the electrical conduction by the plates, and the plates and the elastomer together exert degradative forces that defeat an intruding projectile.

A strain-rate-sensitivity-hardening elastomer has a propensity toward transient high-rate dynamic mechanical strength elevations. As typically embodied by the present invention, this propensity is enhanced by the constraining of the strain-rate-sensitivity-hardening elastomer by the two rigid electrically conductive plates, between which the strain-rate-sensitivity-hardening elastomer is sandwiched and bonded; this confined condition (i.e., between the two plates) further elevates the strength and modulus of the strain-rate-sensitivity-hardening elastomer. During a dynamic event, the present invention's strain-rate-sensitivity-hardening elastomer acts upon a transiting projectile in physical ways (e.g., change of speed, change of direction, deformation) that result in a longer duration of the projectile's transit across the strain-rate-sensitivity-hardening elastomer, thereby affording a longer duration of the present invention's electrical connectivity. During the time of the present invention's electrical connection, the strain-rate-sensitivity-hardening elastomer and the electrification act independently and in concert upon the transiting projectile so as to bring about further degradation of the projectile. In addition, the elevated mechanical strength of the strain-rate-sensitivity-hardening elastomer enables it to more effectively share loads with the two sandwiching rigid electrically conductive plates, thereby even further improving resistance of the back plate to perforation.

As typically embodied, an inventive armor system includes at least two electrically conductive (e.g., metal) plates, at least one layer of highly rate-sensitive elastomer, and an electrical power source. According to typical inventive practice, the highly rate-sensitive elastomer is electrically nonconductive (insulative). Strong electrically conductive materials that may be suitable for practicing the inventive plates include, but are not limited to, steel, titanium, titanium alloy, aluminum, aluminum alloy, and other metals and alloys. Each electrically conductive plate is connected to the electrical power source (e.g., a battery, or a bank of supercapacitors), which supplies electrical current. The electrical power source is capable of delivering a large amount of electrical power (e.g., electrical current) in a very short period of time. The electrically conductive plates are separated by the highly rate-sensitive polymer, each adjacent pair of electrically conductive plates having a highly rate-sensitive polymer layer situated therebetween. Each contiguous plate-polymer-plate trio describes a sandwich construction of two electrically conductive outside plates and a highly rate-sensitive polymer core.

When a high-speed projectile penetrates an electrically conductive plate and at least partially penetrates the adjoining highly rate-sensitive polymeric layer, an electrical connection is formed between the two adjacent electrically conductive plates, thereby completing (closing) the circuit of the two electrically conductive plates with the electrical power source. While the circuit is closed (completed), electricity (e.g., electrical current) is conducted between the two electrically conductive plates. During the time that the penetrative projectile is in transit across the intermediate highly rate-sensitive polymeric layer, an extremely high temperature is associated with the friction of the penetrative projectile with respect to the intermediate highly rate-sensitive polymeric layer. This extreme heat causes a carbonaceous plasma to emanate from the highly rate-sensitive elastomer (elastomers such as polyurea and polyurethance contain carbon) and to at least partially surround the penetrative projectile as a "plasma sheath." The plasma that at least partially envelopes the penetrative projectile is electrically conductive, since a plasma is an ionized gaseous substance that includes freely moving charged particles. The electrical connection between the two adjacent electrically conductive plates is effected and sustained while each of the two adjacent electrically conductive plates is contacted by: the electrically conductive penetrative projectile; or, the electrically conductive plasma sheath; or, both the electrically conductive penetrative projectile and the electrically conductive plasma sheath. That is, the plasma sheath and/or the penetrative projectile physically, and hence electrically, join the two electrically conductive plates that sandwich the highly rate-sensitive polymeric layer. Even in cases in which the penetrative projectile is not electrically conductive, the electrically conductive plasma sheath can act alone to electrically bridge the gap between the two adjacent electrically conductive plates.

Upon completion (closure) of the circuit, a high electrical current level is activated. The penetrative projectile is acted upon by the high current conducted through the circuit. The high current acts to: slow the projectile; deflect the projectile from the projectile's path; distend the projectile's geometry; encourage breakup of the projectile; impart heat to the projectile's surface (This heat also promotes breakup of the projectile). In addition, the highly rate-sensitive elastomer acts to change the velocity of the penetrative projectile in terms of both slowing of the projectile's speed and altering of the projectile's direction.

The highly rate-sensitive elastomer thus serves to increase the time period of the penetrative projectile's traversal of the "gap" (which the highly rate-sensitive elastomer fills) between the two adjacent electrically conductive plates. The increase in traversal duration is beneficial because the time is extended during which the electrical circuitry can be switched to the closed position and the circuitry can be maintained in a closed state, thereby extending the time during which the accompanying electrical energy can act upon the penetrative projectile. Moreover, the increase in amount of electro-influential time permits lower levels of electrical current to be conducted in order to defeat the penetrative projectile. The present invention thus advantageously permits use of low-power electrical units that tend to be light, low-cost (e.g., implementing commercial off-the-shelf components), and portable. For instance, supercapacitors (also known as "ultracapacitors") are commercially available from companies such as Maxwell Technologies Inc., 9244 Balboa Avenue, San Diego, Calif.

The term "elastomer" as used herein broadly refers to any material—polymeric or non-polymeric—having elastic (e.g., viscoelastic) physical character, regardless of whether it includes at least one structural material (e.g., a plasticizer or an antioxidant) that is incorporated therein for at least one enhancement purpose. An "elastomer" can represent either a single elastomeric material, or a mixture (e.g., blend) of plural elastomeric materials, or a mixture (e.g., blend) of either of these elastomer categories with one or more enhancement materials such as plasticizers or antioxidants.

Strain-rate-sensitivity-hardening elastomers are disclosed by the aforementioned Barsoum et al. U.S. Pat. No. 7,300,893 B2 issued 27 Nov. 2007, incorporated herein by reference, and by the aforementioned co-pending application published 26 Apr. 2007 as U.S. Patent Application Publication 2007/0093158 A1, incorporated herein by reference. According to typical inventive practice, the present invention's elastomer is a strain-rate-sensitivity-hardening elastomer. The terms "highly rate-sensitive elastomer," "highly strain-rate-sensitive elastomer," "rate-sensitivity-hardening elastomer," and "strain-rate-sensitivity-hardening elastomer" are used interchangeably herein to refer to an elastomer that is characterized by the ability—under ballistic conditions and/or blast conditions—to practically immediately react to impact so as to rigidify while absorbing impact-related energy, and to then practically immediately return to its elastic (non-rigid) condition.

A typical strain-rate-sensitivity-hardening elastomer that is suitable for inventive practice is characterized by high strain-rate sensitivity (strain-rate-sensitivity hardening) with respect to strain rates in the range of approximately 1,000/second to approximately 1,000,000/second. The term "range" is intended herein to be "inclusive," i.e., to include the delimiting (e.g., upper and lower) values of the range. Depending on the inventive embodiment, the inventive highly strain-rate-sensitive elastomer may also be characterized by high strain-rate-sensitivity outside of this $10^3$/sec-$10^6$/sec range of strain rates. According to usual inventive practice, the strain-rate-sensitivity-hardening elastomer is polymeric. Strain-rate-sensitivity-hardening elastomers suitable for inventive practice include, but are not limited to, polymeric substances from the polyurea family, the polyurethane family, and both the polyurea and polyurethane families. A frequently preferred strain-rate-sensitivity-hardening elastomer for inventive practice is a polyurea, or a mixture (e.g., blend) of polyurea and polyurethane.

A strain-rate-sensitivity-hardening elastomer has the quality of reacting instantaneously to impact (for instance, at strain rates in the $10^3$/sec-$10^6$/sec range) so as to temporarily become significantly more rigid than it is in its normal (non-impacted) state, and of then returning to its normal elastic (e.g., viscoelastic) state shortly after absorbing energy associated with the impact. Otherwise expressed, a strain-rate-sensitivity-hardening elastomer is in an elastic state before absorbing energy from a projectile, then tends toward a rigid state (i.e., "hardens" or "stiffens") when absorbing energy from the projectile, and then tends toward an elastic state after absorbing energy from the projectile. A strain-rate-sensitivity-hardening elastomer exhibits greatly increased transient mechanical property changes under rapid loading, such as when exposed to explosively generated forces, and exhibits high elongations during and after load removal.

Generally speaking, a strain-rate-sensitivity-hardening elastomer characterized by high strain-rate-sensitivity in this $10^3$/sec to $10^6$/sec approximate range of strain rates will be characterized by a much higher Young's modulus and a much higher yield strength elevation when subjected to strain rates in this $10^3$/sec to $10^6$/sec range, as compared with Young's modulus and yield strength elevation when subjected to strain rates in much lower ranges. By way of example, Young's modulus at typical "static" (or "quasi-static") strain rates, e.g., strain rates of approximately $10^{-3}$/sec, is in the approximate range of 1,000 psi to 6,000 psi. Young's modulus at strain rates in the approximate range of $10^3$/sec to $10^6$/sec is in the approximate range of 350,000 psi to 500,000 psi. Yield strength elevation at strain rates of approximately $10^{-3}$/sec is in the approximate range of 2,000 psi to 4,000 psi. Yield strength elevation at strain rates in the approximate range of $10^3$/sec to $10^6$/sec is in the approximate range of 70,000 psi to 80,000 psi, or greater.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein like numbers indicate same or similar parts or components, and wherein:

FIG. 14 illustrates interaction of the projectile shown in FIG. 1 with the inventive armor system embodiment shown in FIG. 14.

DESCRIPTION OF EXEMPLARY EMBODIMENTS OF THE INVENTION

Figure 1:
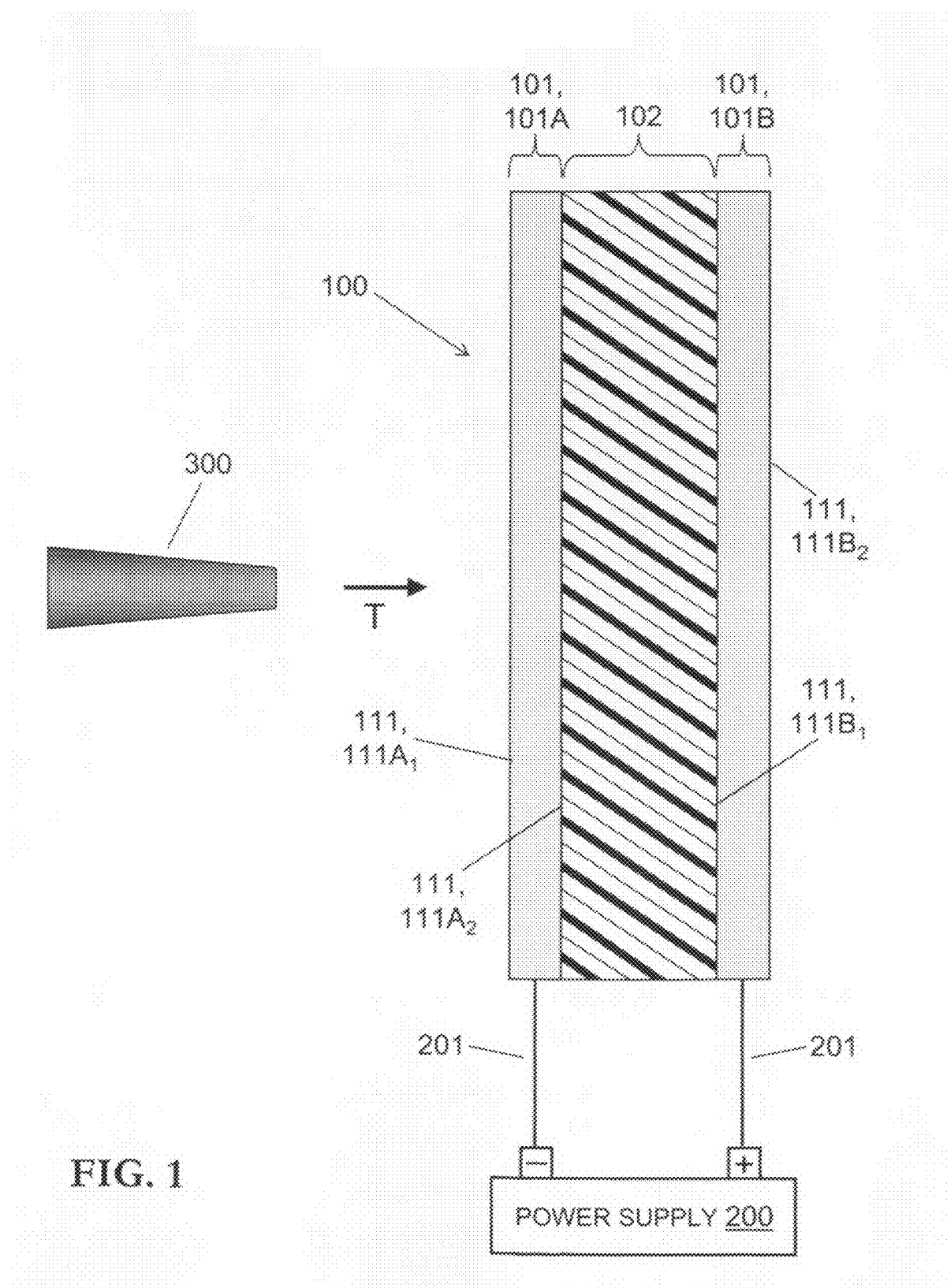
FIG. 1 is a schematic view of a projectile and of an embodiment of an armor system in accordance with the present invention, including a cross-sectional view of the three-layer laminar composite armor component of the inventive armor system.

Referring now to FIG. 1, the inventive armor system includes armor structure 100, electrical power supply 200, and electrical conductors (e.g., wires) 201. Electrical power supply 200 is electrically connected, via electrical conductors 201, to the two plates 101, viz., plate 101A and plate 101B. Plates 101A and 101B respectively constitute the negative and positive electrodes of an open (but closable) circuit described by plates 101A and 101B, conductors 201, and power supply 200. Armor structure 100 represents a composite laminar material system—more specifically, a sandwich construction—that includes two outside rigid electrically conductive (e.g., metallic) plates 101 and, therebetween, a core layer of highly rate-sensitive elastomer 102.

Plates 101A and 101B are shown to be planar, parallel, and geometrically congruent. Plate 101A, the front (strike) plate relative to projectile 300, has a flat front (strike) surface 111A$_1$ and a flat back surface 111A$_2$. Plate 101A, the back plate relative to projectile 300, has a flat front (strike) surface 111B$_1$ and a flat back surface 111B$_2$. Plate surfaces 111A$_1$, 111A$_2$, 111B$_1$, and 111B$_2$ are parallel to each other. A planar, parallel configuration of the electrically conductive plates 101 is typical of inventive practice; nevertheless, the present invention can be practiced whereby at least one plate 101 is curved, and/or the plates 101 are not parallel, and/or the plates 101 geometrically differ. Moreover, the elastomeric layer 102 is shown to be much thicker than each of the plates 101, which is typical of but not necessary for inventive practice.

Projectile 300 is shown traveling along a trajectory T toward and verging on penetrating the inventive armor structure 100. Projectile 300's trajectory T is shown for illustrative purposes to be perpendicular to front plate surface 111A$_1$ and to armor structure 100 generally; in actual practice, it is possible that an inventive armor structure 100 encounter a projectile that approaches from any angle. With reference to FIG. 2 through FIG. 5, projectile 300 continues to travel upon reaching inventive armor structure 100.

Figure 18:
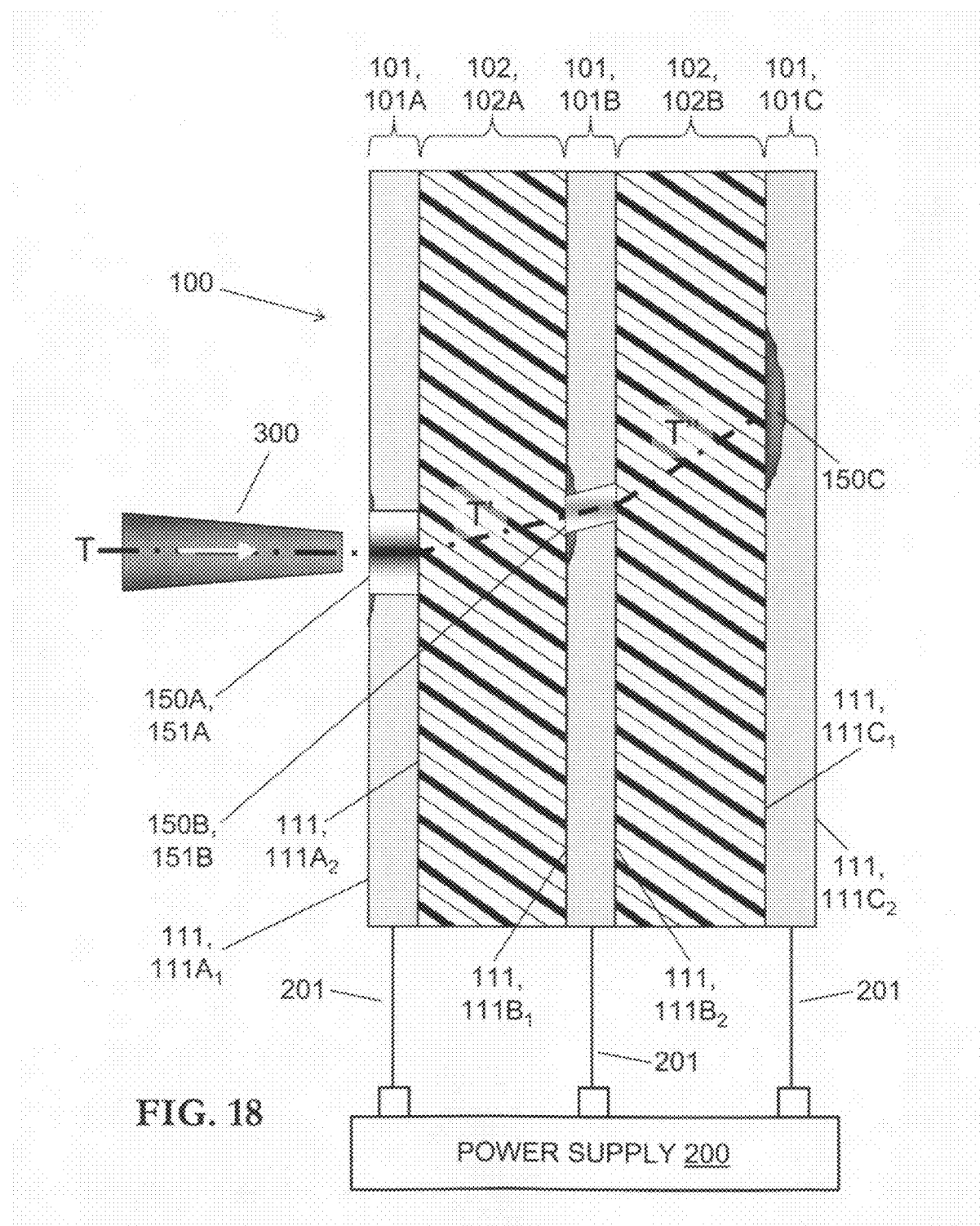
FIG. 18 is a view, similar to the view of FIG. 14, wherein the interaction of the projectile with the inventive armor system embodiment shown in FIG. 14 differs from the interaction shown in FIG. 14.

For illustrative purposes, projectile 300 is shown in FIG. 2 through FIG. 5 to continue in a trajectory T that defines a straight and perpendicular path. The time that it takes for the high-velocity 300 to penetrate and be stopped by inventive armor structure 100 is to be understood to be a very small fraction of a second. It is to be further understood that the inventive armor system, which can be variously embodied, will frequently influence an impinging projectile 300 so as to change its trajectory T, such as depicted by way of example in FIG. 18.

Figure 2:
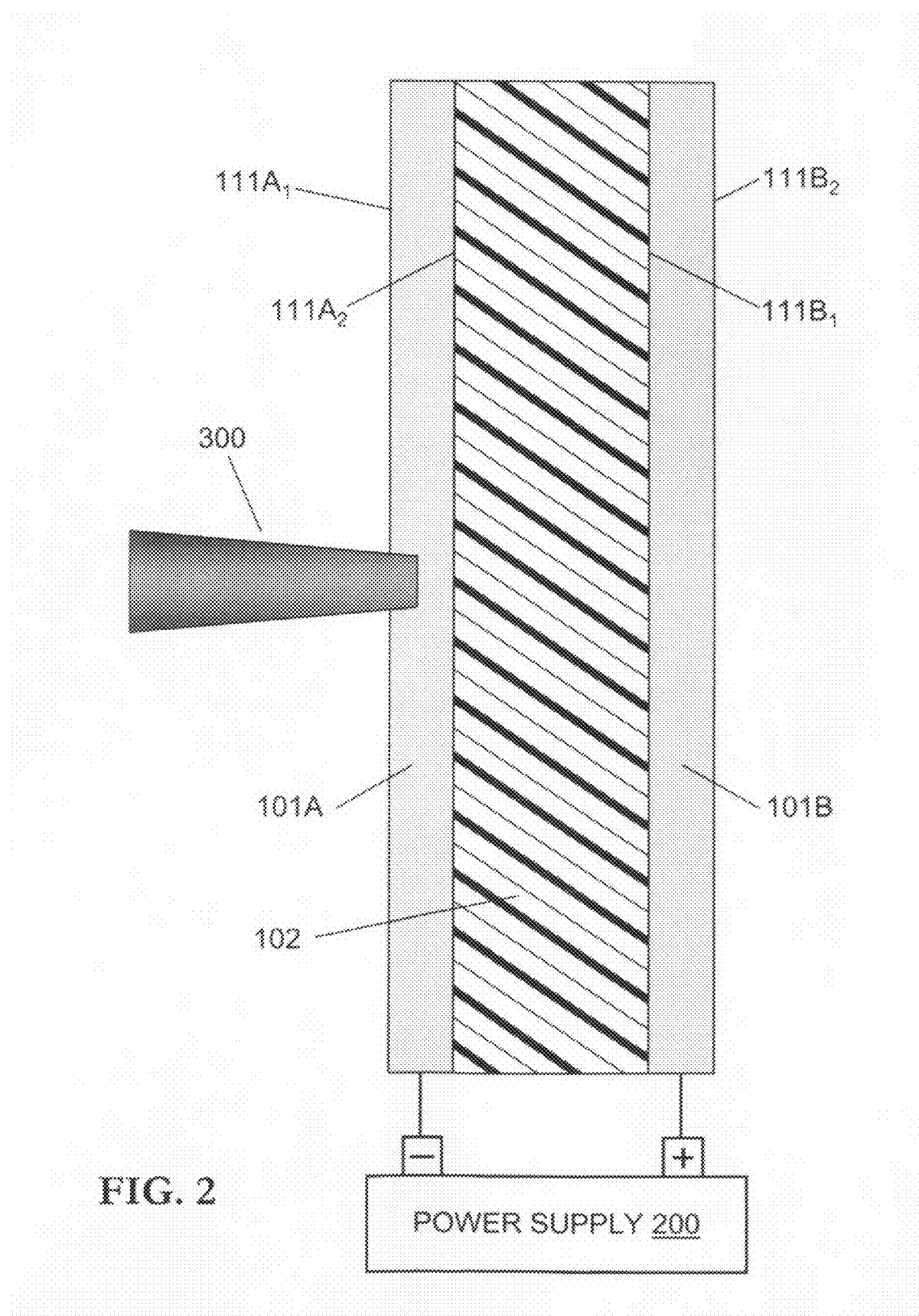
FIG. 2 through FIG. 5 are sequential views, each similar to the view of FIG. 1, illustrating interaction of the projectile shown in FIG. 1 with the inventive armor system embodiment shown in FIG. 1.

As shown in FIG. 2, projectile 300 begins its intrusion by passing through front surface 111A$_1$ and into front plate 101A. Once projectile 300 completely penetrates front plate 101A, passing through back surface 111A$_2$ and slightly entering elastomeric layer 102, the highly rate-sensitive elastomeric layer 102 begins to act upon projectile 300.

Figure 3:
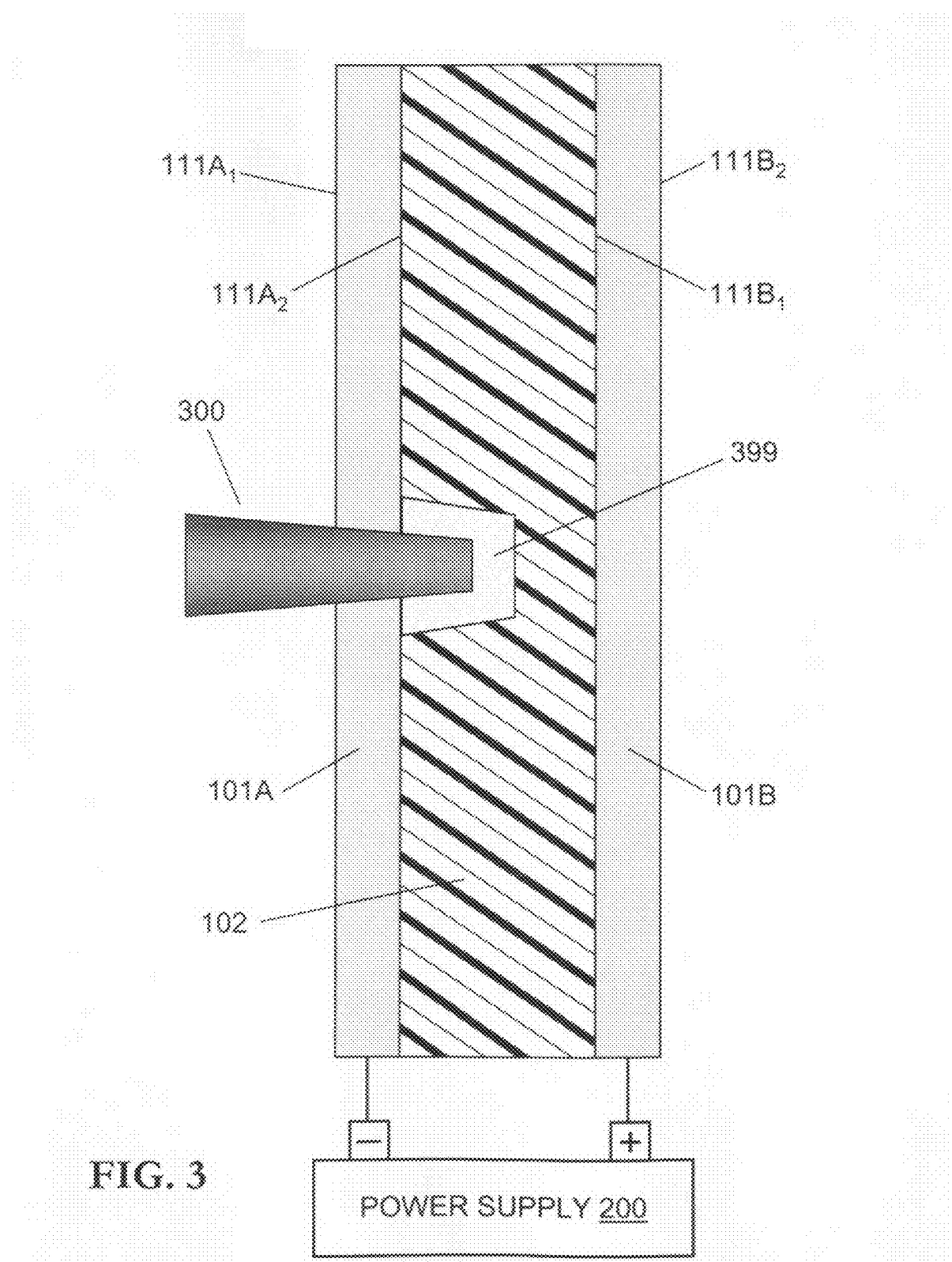

As shown in FIG. 3, a carbonaceous plasma sheath 399 forms around the portion of projectile 300 that protrudes into elastomeric layer 102. The plasma sheath 399 that partially envelops projectile 300 has not yet reached the inside surface 111B$_2$ of back plate 101B. As projectile 103 proceeds deeper into elastomeric layer 102, a larger portion of projectile 103 is exposed to elastomeric layer 102, and a commensurately larger plasma sheath envelops the exposed portion of projectile 103.

Figure 4:
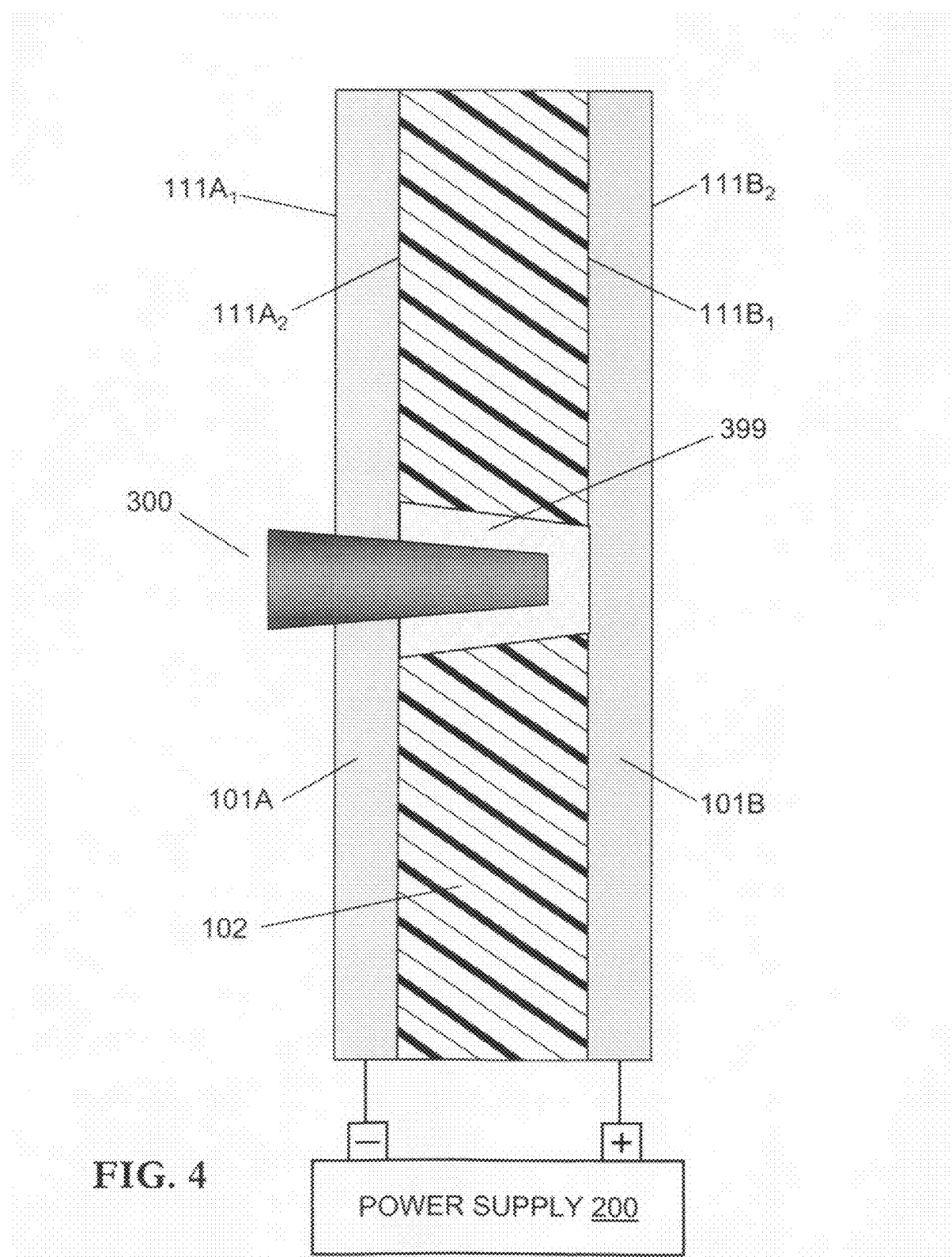

As shown in FIG. 4, projectile 103 having moved closer to surface 111B$_2$ of back plate 101B, its plasma sheath 399 reaches the front surface 111B$_1$ of back plate 101B. At this point, the electrical circuit that is incompletely formed by electrically conductive plates 101A and 101B and power supply 200 is completed by the unified body that includes projectile 300 and plasma sheath 399. In effect, plasma sheath 399 extends (lengthens) projectile 103 in a forward direction so as to reach front surface 111B$_1$ of back plate 101B. By virtue of projectile 300 contacting front plate 101A and plasma sheath 399 contacting back plate 101B, the electrical connection is effected in a manner akin to closure of a switch, thereby completing (activating) the circuit.

Note that, as shown in FIG. 4, plasma sheath 399 also contacts front plate 101A, but this is probably not necessary to effectuation of the electrical connection. Generally speaking, if a projectile 300 makes direct contact with a plate 101, such contact electrically suffices with respect to that plate 101.

Figure 5:
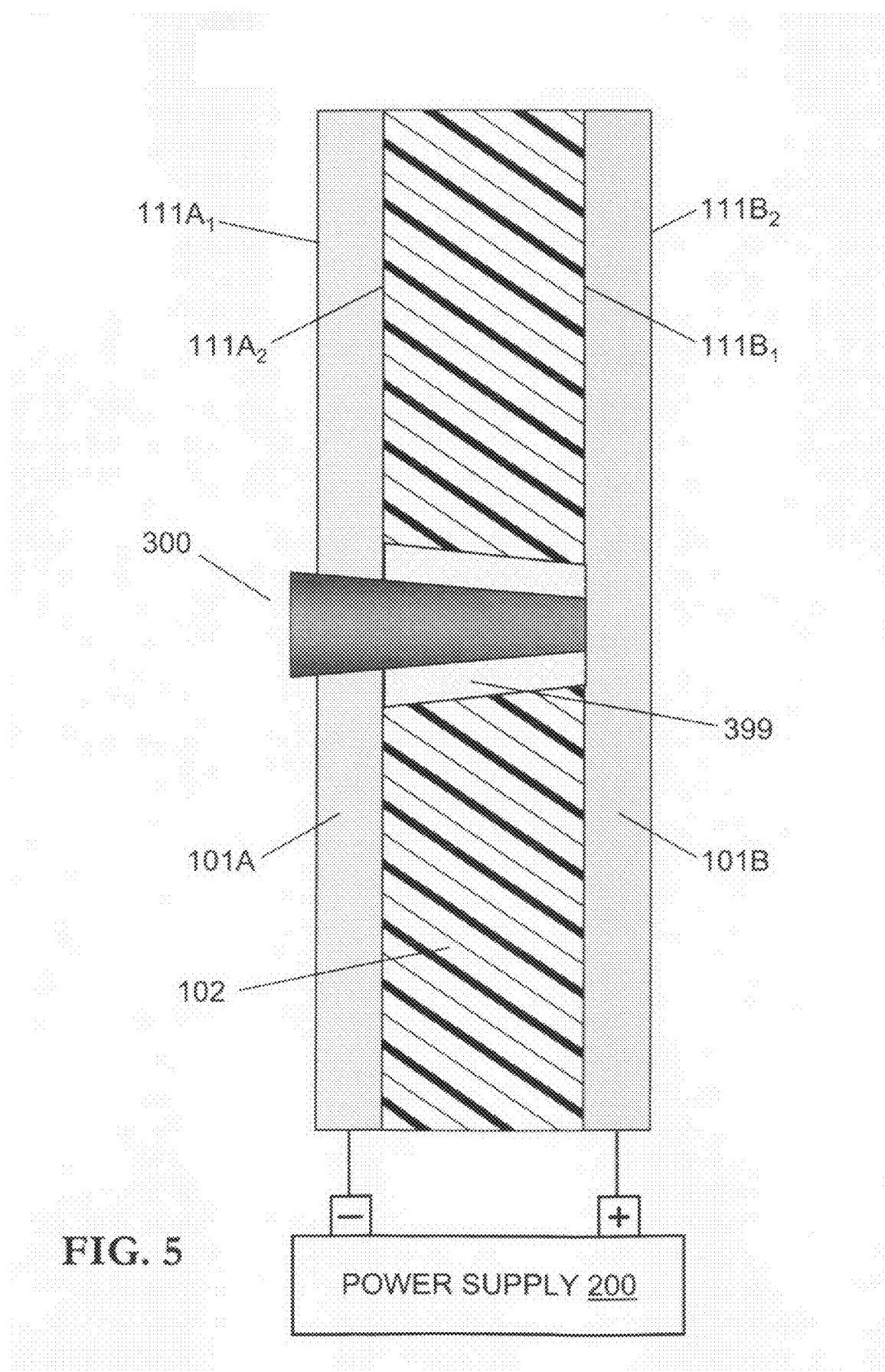

The projectile 300—plasma sheath 399 combination continues to move generally forward, all the while maintaining contact with both front plate 101A and back plate 101B so as to sustain the electrical connection of the circuitry. As shown in FIG. 5, projectile 103 effects the electrical connection on its own, as projectile 300 has moved sufficiently forward that it directly contacts back plate 101B while still contacting front plate 101A. Again, plasma 399 continues to contact both front plate 101A and back plate 101B, but it is likely that neither contact by plasma 103 is necessary for effecting the electrical connection vis-à-vis the corresponding plate 101.

While the circuit is in an activated state, electrical current generated by power supply 200 (e.g., one or more batteries, or one or more capacitors, or one or more supercapacitors, or some combination thereof) pulses or surges through projectile 300, thereby affecting projectile 300 in terms of its speed, direction, and physical form (e.g., by causing projectile 300 to deform and/or break up). All the while that at least a portion of projectile 103 is situated within elastomeric layer 102—a time frame that includes both a duration that the electrical circuit is inactive (open) and a duration that the electrical circuit is active (closed)—the highly strain-rate-sensitive elastomer 102 exerts its own influence upon the projection in terms of speed, direction, and physical form (e.g., by causing projectile 300 to deform and/or break up).

Figure 6:
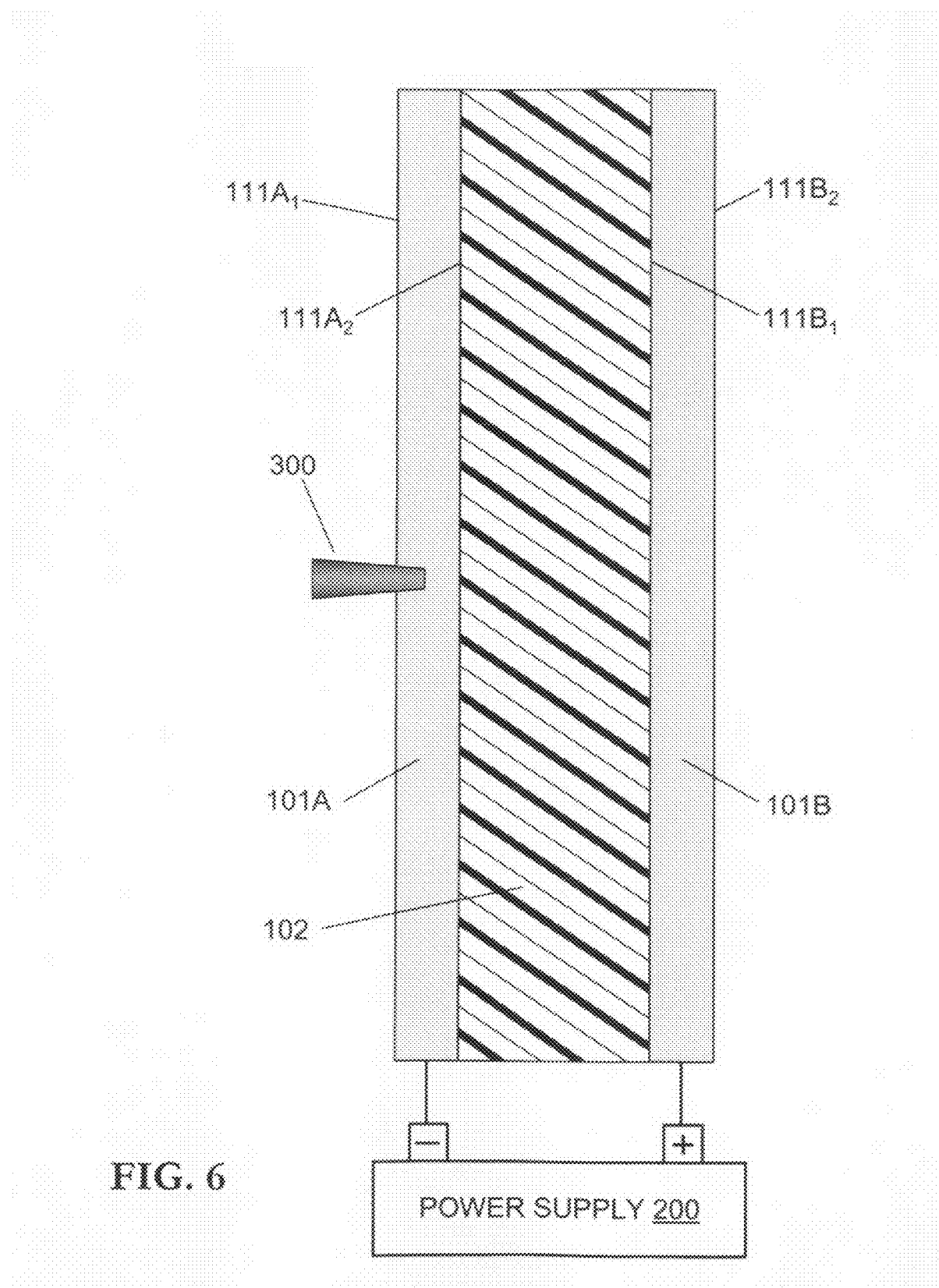
FIG. 6 through FIG. 8 are sequential views, similar to the sequential views of FIG. 2 through FIG. 5, illustrating interaction, with the inventive armor system embodiment shown in FIG. 1, of a projectile that is smaller than that shown in FIG. 1 through FIG. 5.
Figure 7:
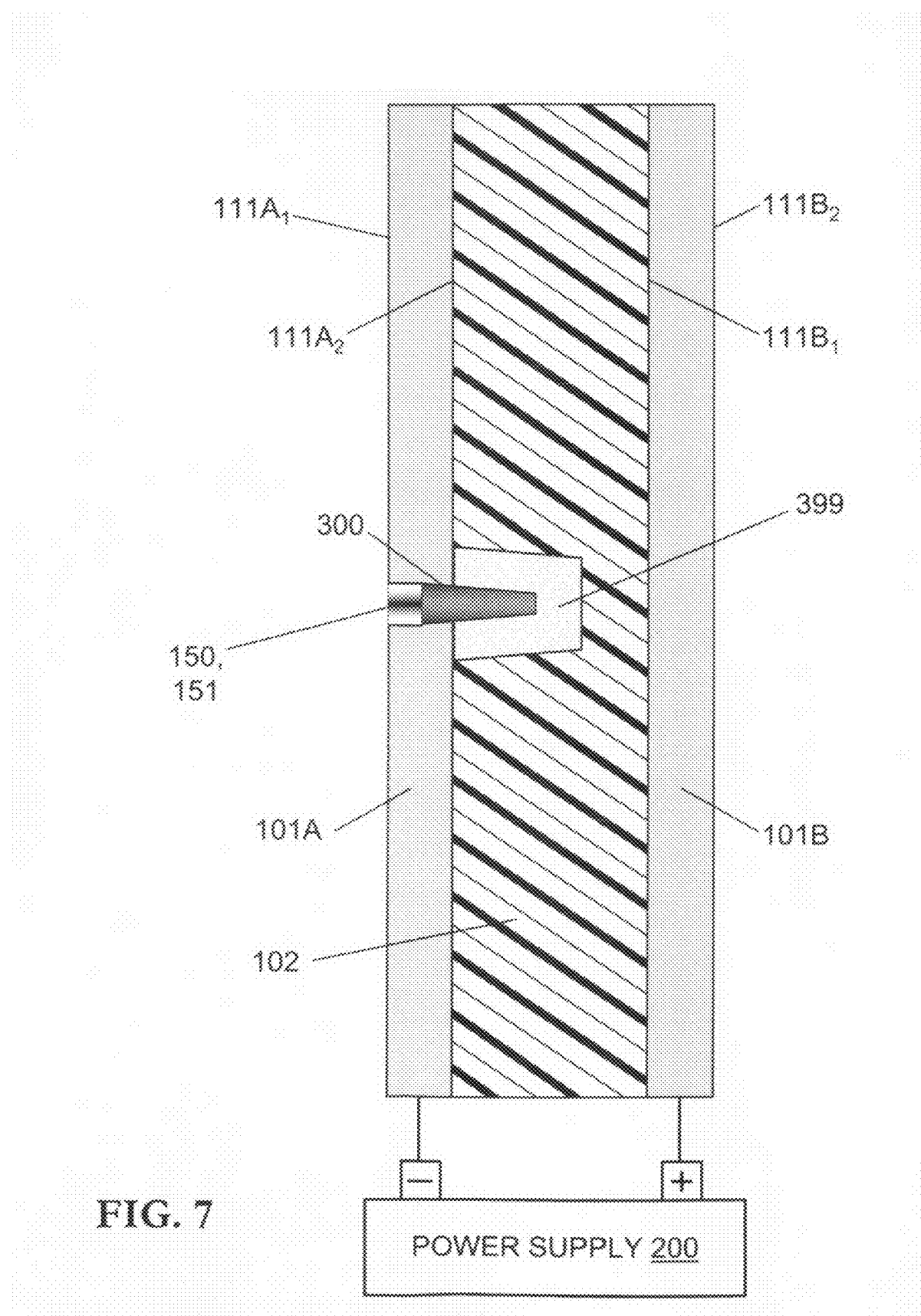
Figure 8:
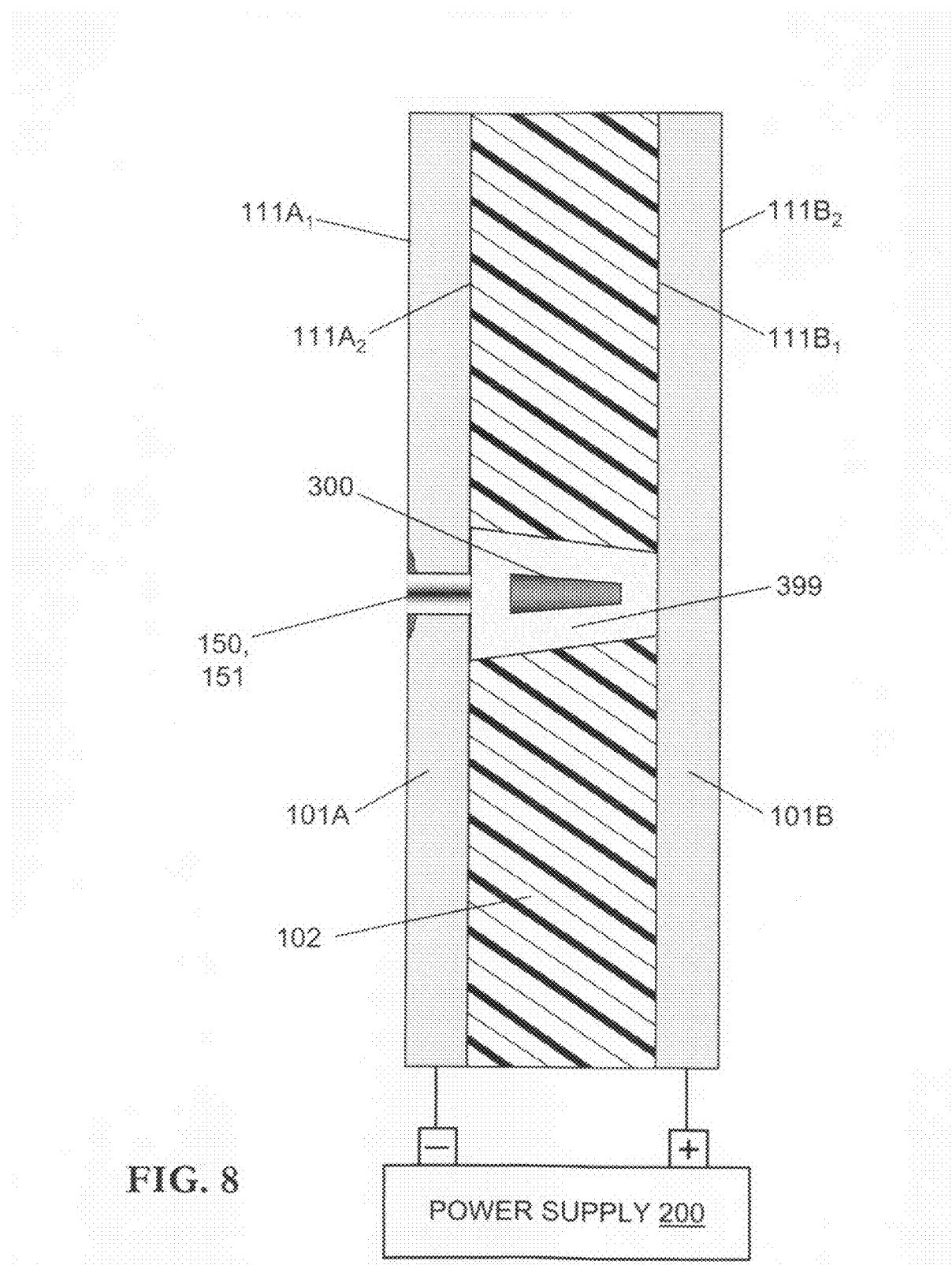

The sequence FIG. 6 through FIG. 8 and the sequence FIG. 9 through FIG. 12 each illustrate the present invention's projectile-defeating physical mechanism with respect to a smaller projectile 300 than the projectile 300 shown in FIG. 2 through FIG. 5. The inventive projectile-defeating mechanics are similar in each of the three sequences, viz., FIG. 2 through FIG. 5, FIG. 6 through FIG. 8, and FIG. 9 through FIG. 12. The projectile 300 of FIG. 2 through FIG. 5 is the largest of the three, the projectile 300 of FIG. 6 through FIG. 8 is the smallest of the three, and the projectile 300 of FIG. 9 through FIG. 12 is medium-sized of the three. In each of these time-sequence examples, the electrical circuit is connectively completed by at least one of (i) projectile 300 and (ii) plasma sheath 399. In other words, the electrical circuit may be connectively completed by either projectile 300 alone, or by both projectile 300 and plasma sheath 399, or by plasma sheath 399 alone. When plasma sheath 399 participates in the connection, it extends (lengthens) projectile 103 in either or both of a backward direction and a forward direction so as to reach either or both of the front plate 101A and the back plate 101B.

As shown in FIG. 6, projectile 300 begins to enter front plate 101A at front surface 111A$_1$. As shown in FIG. 7, carbonaceous plasma sheath 399 forms around the portion of projectile 300 that protrudes into elastomeric layer 10, but this plasma sheath 399 falls short of the front surface 111B$_1$ of back plate 101B. As shown in FIG. 8, projectile 300 having moved completely clear of front plate 101A and closer to surface 111B$_2$ of back plate 101B, plasma sheath 399 completely envelops projectile 300, thereby reaching both front and back—i.e., both the back surface 111A$_2$ of front plate 101A and the front surface 111B$_1$ of back plate 101B— whereupon the electrical circuit is completed by the unified body that includes projectile 300 and plasma sheath 399. Damage 150, which includes a perforation 151, results in front plate 101A from the passage therethrough of projectile 300. In effect, plasma sheath 399 shown in FIG. 8 extends (lengthens) projectile 103 in both a backward direction and a forward direction so as to reach both the front plate 101A and the back plate 101B.

Figure 9:
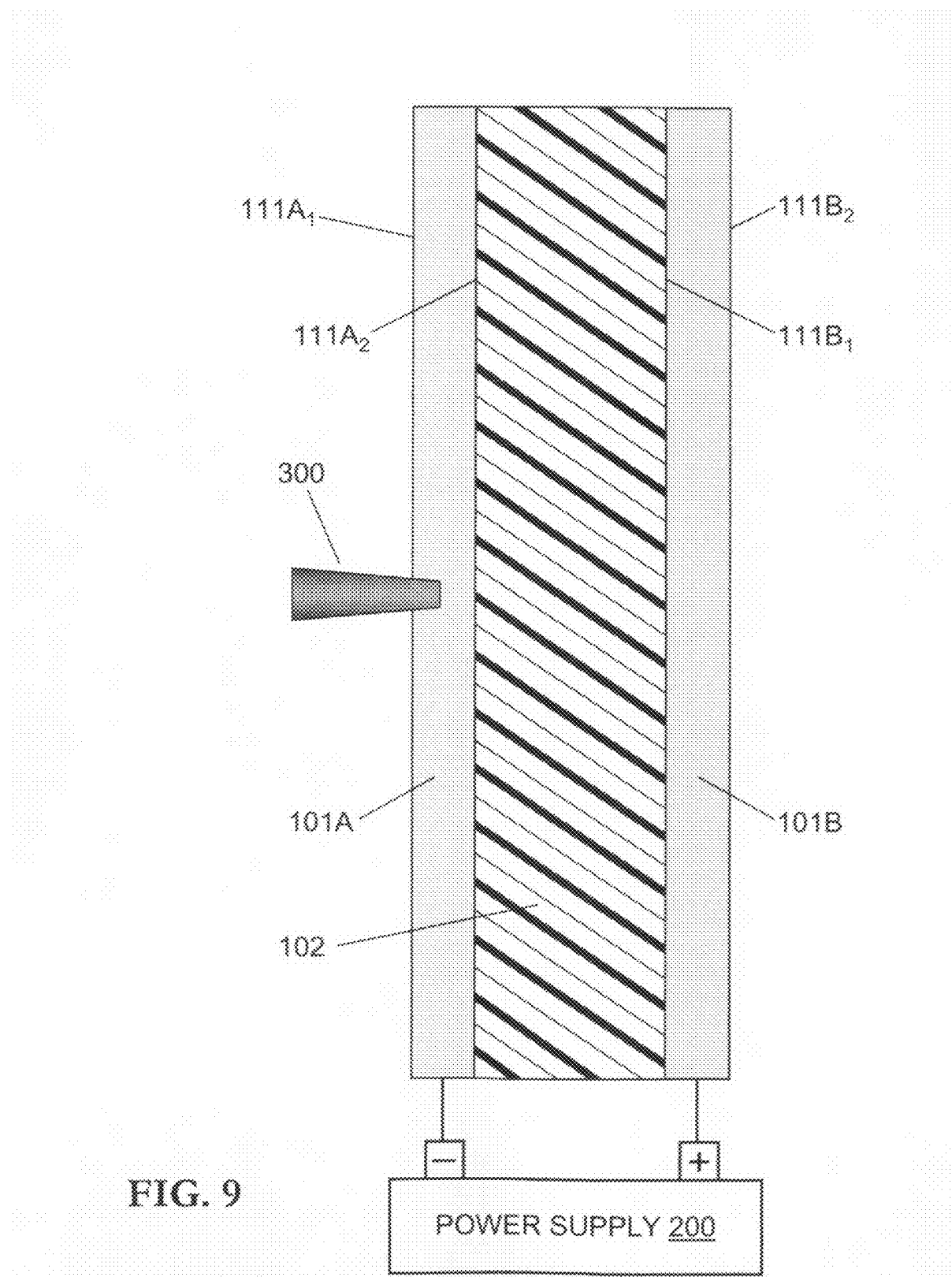
FIG. 9 through FIG. 12 are sequential views, similar to the sequential views of FIG. 2 through FIG. 5 and of FIG. 6 through FIG. 8, illustrating interaction, with the inventive armor system embodiment shown in FIG. 1, of a projectile that is smaller than that shown in FIG. 1 through FIG. 5 but larger than that shown in FIG. 6 through FIG. 8.
Figure 10:
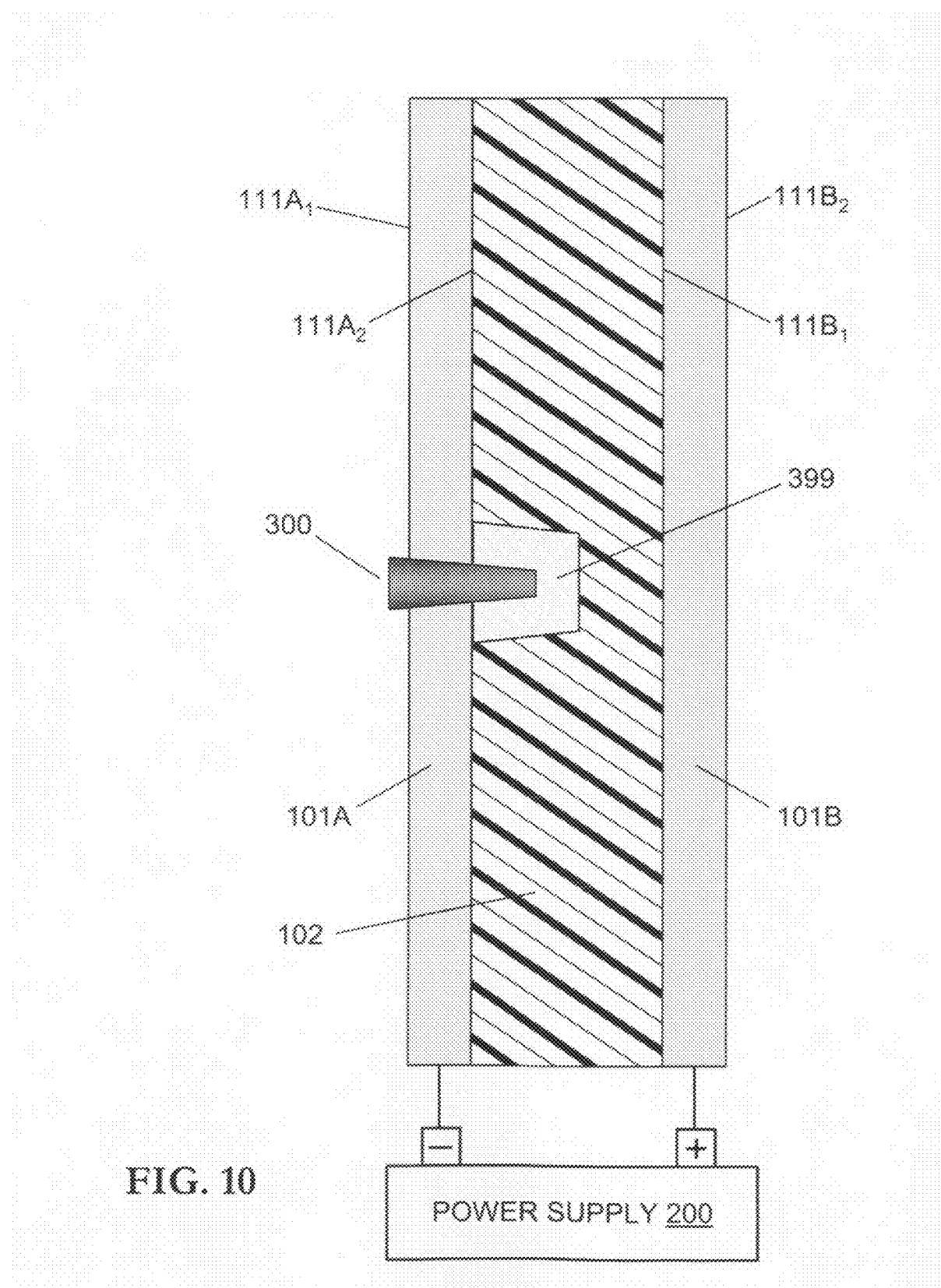
Figure 11:
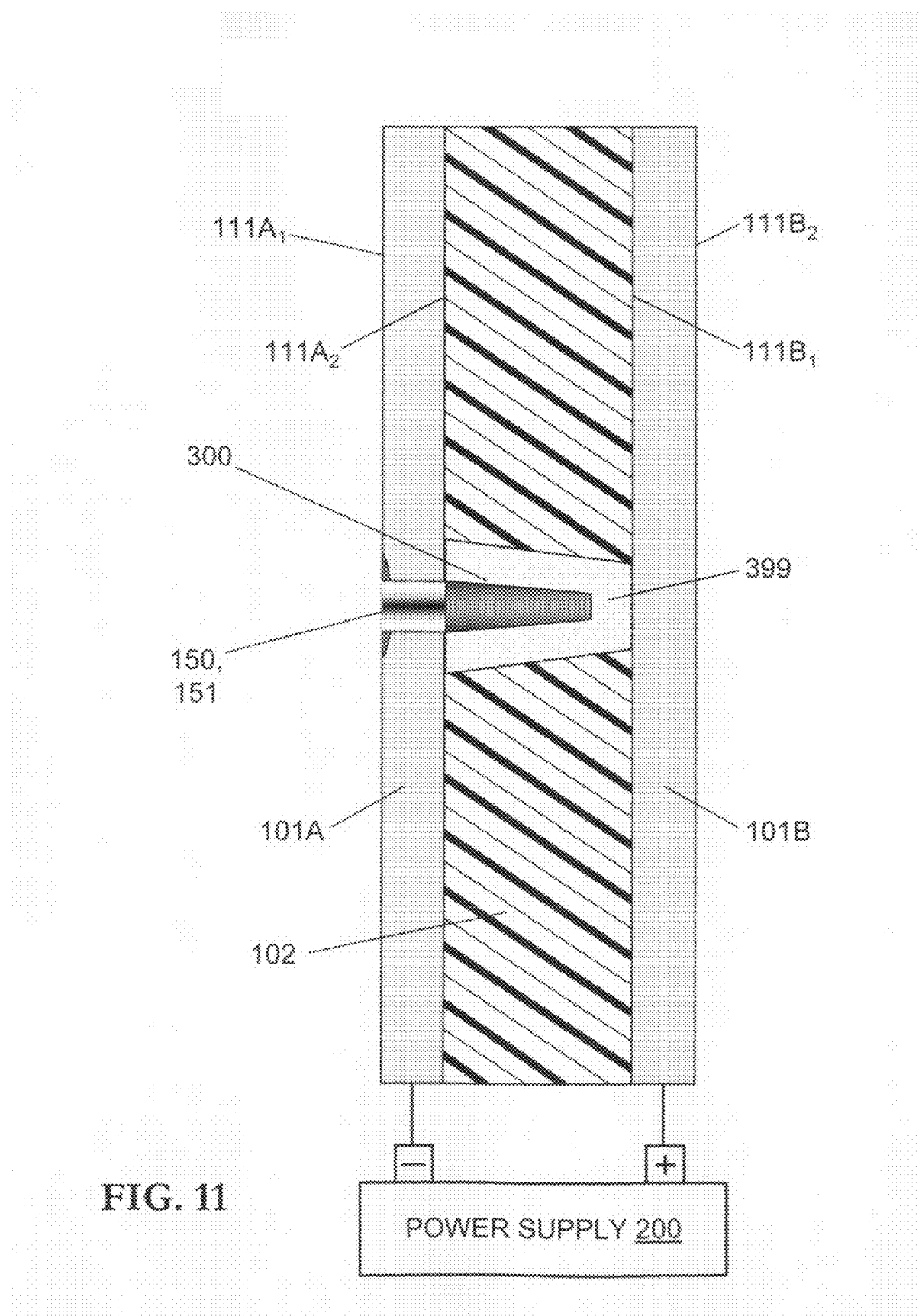
Figure 12:
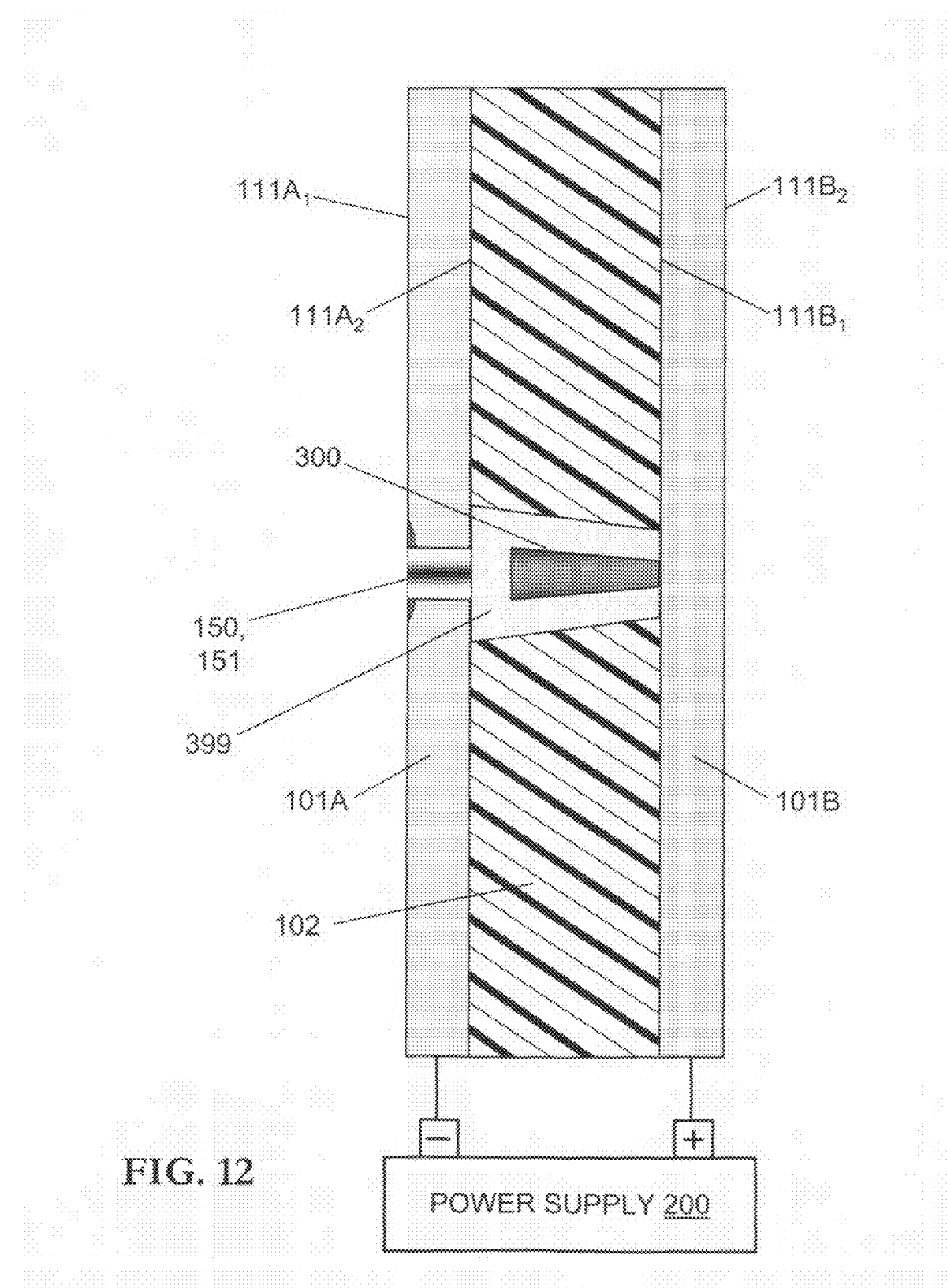

As shown in FIG. 9, projectile 300 begins to enter front plate 101A at front surface 111A$_1$. As shown in FIG. 10, carbonaceous plasma sheath 399 forms around the portion of projectile 300 that protrudes into elastomeric layer 10, but this plasma sheath 399 falls short of the front surface 111B$_1$ of back plate 101B. As shown in FIG. 11, projectile 300 having moved closer to surface 111B$_2$ of back plate 101B, plasma sheath 399 envelops most of projectile 300, thereby reaching the front surface 111B$_1$ of back plate 101B. Damage 150, which includes a perforation (through-hole) 151, results in front plate 101A from the passage therethrough of projectile 300. The electrical connection shown in FIG. 11 is made via projectile 300 with respect to front plate 101A, and via plasma sheath 399 with respect to back plate 101B. Projectile 300 continues to move toward back plate 101B, and during a very brief period after the snapshot shown in FIG. 11 but before the snapshot shown in FIG. 12, an electrical connection is made via plasma sheath 399 with respect to both front plate 101A and back plate 101B, similarly as shown in FIG. 8. As shown in FIG. 12, the electrical connection is made via a plasma sheath 399 with respect to front plate 101A, and via projectile 300 with respect to back plate 101B.

Figure 13:
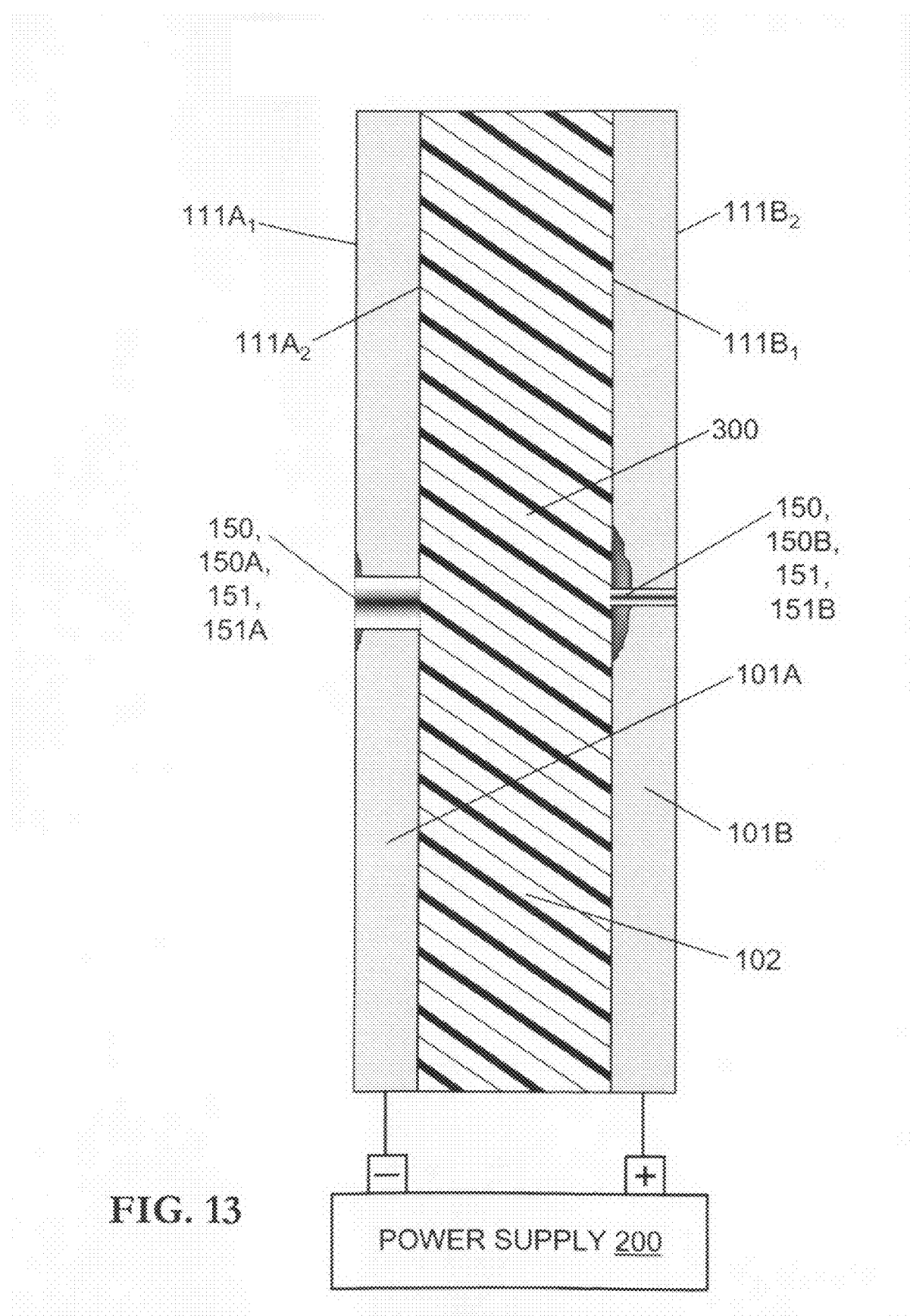
FIG. 13 is a view, similar to the view of FIG. 1, of the mitigated damage that may ensue from interaction, such as illustrated in FIG. 9 through FIG. 12, of a projectile with the inventive armor system embodiment shown in FIG. 1.

FIG. 13 exemplifies resultant damage to an inventive armor system's armor structure 100 from its encounter with a projectile such as the "medium-sized" projectile 300 shown in FIG. 9 through FIG. 12. Damage 150A, which includes perforation 151A, is commensurate with the size (e.g., thickness or diameter) of the penetrative projectile 300. While at least a portion of the projectile 300 is in the elastomer 102 region, the projectile 300 falls under the inventive degradative influence of either or both of (i) elastomer 102 and (ii) circuitous electrification brought about by plate-to-plate electrical connection. In typical encounters of a projectile by an inventive armor system, at any time that inventive degradative influence takes place, either the elastomer 102 alone will be acting upon the projectile 300, or both the elastomer 102 and the circuitous electrification will be acting upon the projectile 300.

The damage 150B to plate 101B, shown in FIG. 13, is significantly mitigated vis-à-vis what it would be in the absence of both the highly strain-rate-sensitive elastomer 102 and the circuitous electrification. Depending on the inventive embodiment, the encountered projectile 300, and the attendant mechanics and dynamics, damage 150B may or may not include a slight perforation 151B. Although a completely non-perforated back plate 101B is usually associated with greater protectiveness than a slightly perforated back plate 101B, even the latter consequence of inventive practice will afford adequate protection under most circumstances.

The present invention admits of practice involving one or more elastomeric layers and two or more rigid electrically conductive plates (e.g., metal plates). According to usual inventive practice, two electrically conductive plates 101 are at the extreme ends (e.g., front and back) of the inventive armor structure 100, with the plates 101 and the electrically nonconductive elastomeric layers 102 alternating with each other. Mathematically expressed, the number of elastomeric layers 102 is "n," and the number of plates 101 is "n+1." The plates 101 are connected to a power supply 200 (including one or more power sources) so that each adjacent pair of plates 101 has an elastomeric layer 102 therebetween and constitutes the positive and negative electrodes of the same circuit.

Figure 14:
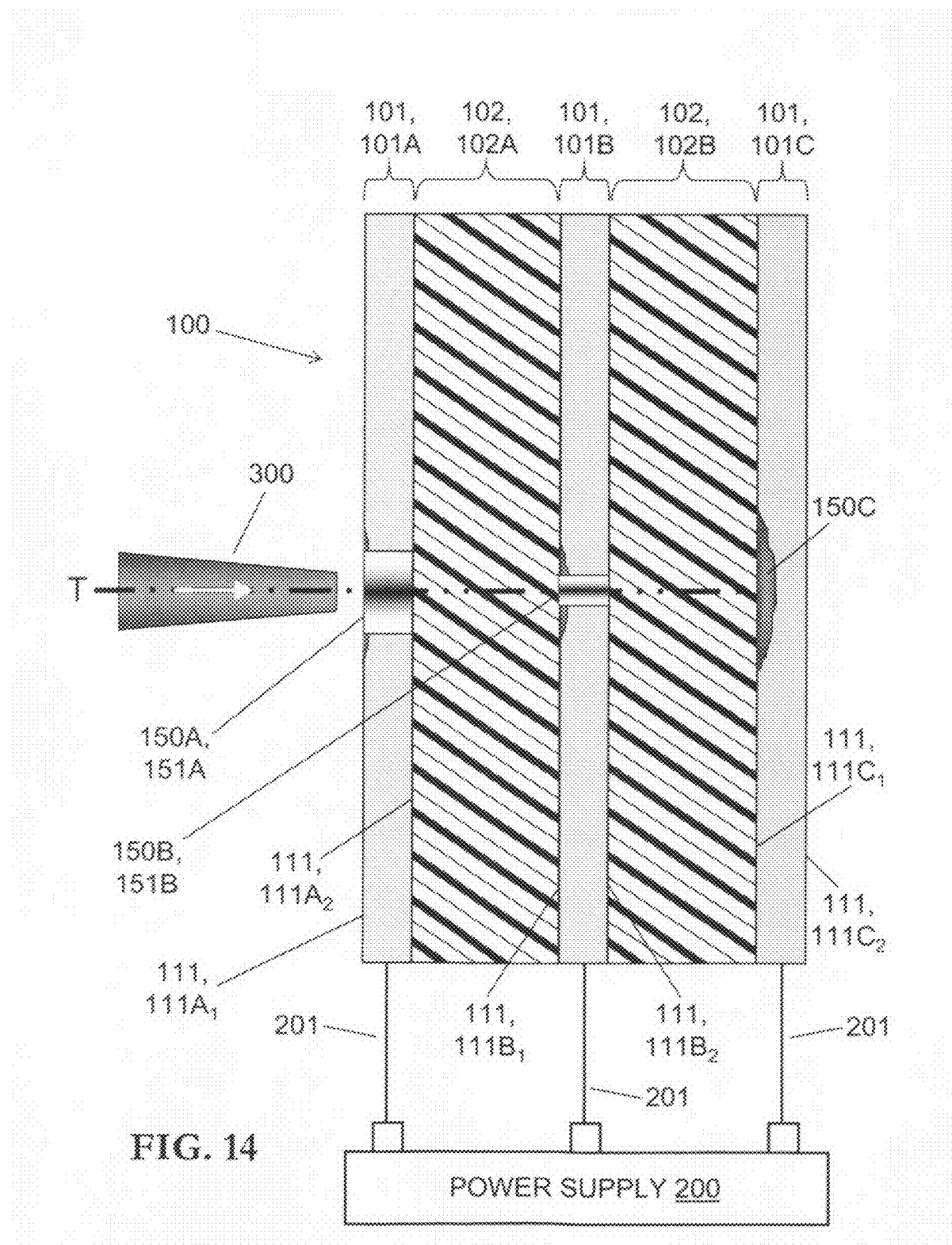
FIG. 14 is a view, similar to the view of FIG. 1, of a different embodiment of an armor system in accordance with the present invention, including a cross-sectional view of the five-layer laminar composite armor component of the inventive armor system.
Figure 15:
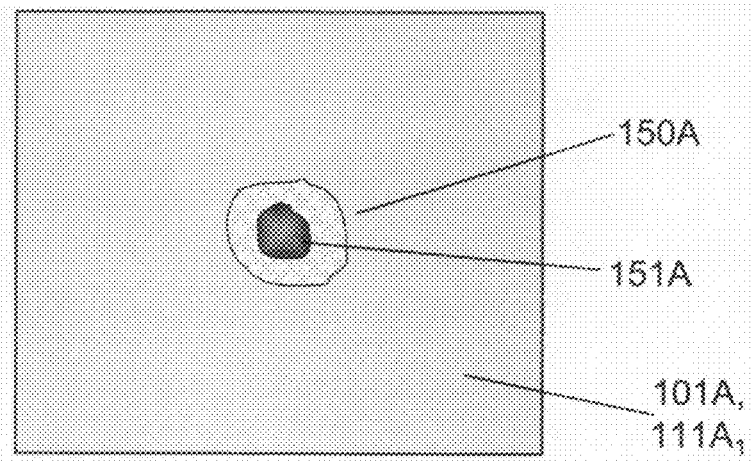
FIG. 15 through FIG. 17 are front plan views, respectively, of the three rigid electrically conductive plates shown in FIG. 14. Each of FIG. 15 through FIG. 17 depicts damage ensuing from the interaction of the projectile shown in FIG. 1 with the inventive armor system embodiment shown in FIG. 14.
Figure 16:
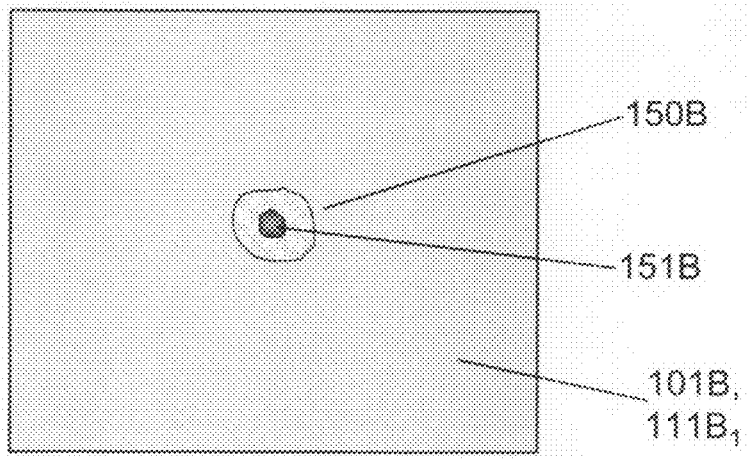
Figure 17:
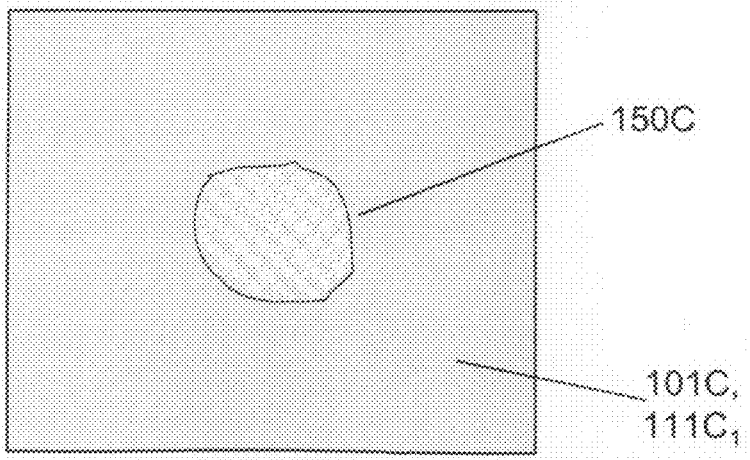

With reference to FIG. 14 through FIG. 16, a propitious mode of inventive practice for some applications provides for three electrically conductive plates 101 and two highly strain-rate-sensitive elastomeric layers 102, alternately configured. Inventive armor structure 100 shown in FIG. 14 and FIG. 16 is not unlike a "double-decker sandwich." Front plate 101A has a front surface $111A_1$ and a back surface $111A_2$. Middle plate 101B has a front surface $111B_1$ and a back surface $111B_2$. Back plate 101C has a front surface $111C_1$ and a back surface $111C_2$. Plates 101A, 101B and 101C are each connected via conductor 201 to a power supply 200 so that each adjacent pair of plates 101 (i.e., wherein the first adjacent pair is plates 101A and 101B, and the second adjacent pair is plates 101B and 101C) represents an electrode pair amenable to mutual electrical connection via passage therethrough of a projectile 300 and the accompanying formation of a plasma sheath 399.

FIG. 14 and FIG. 16 are similar diagrams illustrating, over a split second in time, the transit of a projectile 300 across the inventive armor structure 100, and the associated dynamics. They differ insofar as FIG. 14 portrays a constantly straight trajectory T that is perpendicular to inventive armor structure 100, whereas FIG. 16 portrays the originally straight and perpendicular trajectory T of FIG. 14, which then varies (in the time frame during which projectile 300 is partially situated in elastomeric layer 102A) to a first oblique trajectory T', and then varies again (in the time frame during which projectile 300 is partially situated in elastomeric layer 102B) to a second oblique trajectory T".

Note that perforations (through-holes) 151A and 151B result in plates 101A and 101B, respectively, but no perforation results in plate 101C. Projectile 300 causes: damage 150A, which includes perforation 151A, in plate 101A; damage 150B, which includes perforation 151B, in plate 101B; damage 150C, which does not include any perforation, in plate 101C. Perforation 151B (in plate 101B) is much smaller than perforation 151A (in plate 101A). It is thus seen that the back plate 101C, though damaged (e.g., dented), is entirely non-perforated, thus remaining sufficiently intact to entirely prevent penetration of projectile 300 or harmful pieces/fragments/debris thereof. The inventive armor system thereby protects persons and objects situated behind back plate 101C from serious injury and damage. Even if damage 150C to plate 101C were to include a slight perforation, such as perforation 151B shown in FIG. 13, under most circumstances the people behind plate 101C would remain safely protected.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. An armor system comprising a first rigid electrically conductive plate, a second rigid electrically conductive plate, an elastomeric layer between said first plate and said second plate, and an electrical power supply electrically connected to said first plate and said second plate so as to form an electrical circuit that is open between said first plate and said second plate, wherein electrification is effected, upon closure of said electrical circuit, of a moving projectile that penetrates said first plate so that at least a portion of said projectile is situated in said elastomeric layer, said closure of said electrical circuit being effected upon establishment, between said first plate and said second plate, of electrical connectivity via at least one of said projectile and a plasma sheath, said plasma sheath at least partially enveloping said projectile and being thermally generated in said elastomeric layer in association with friction of said elastomeric layer with respect to said at least a portion of said projectile that is situated in said elastomeric layer.

2. The armor system of claim 1, wherein said electrification of said projectile affects said projectile by causing at least one of:
    decrease in speed of said projectile;
    change of direction of said projectile;
    degradation of said projectile.

3. The armor system of claim 1, wherein said electrification is sustained while at least one of said projectile and said plasma sheath is in contact with each of said first plate and said second plate.

4. The armor system of claim 1, wherein:
    said first plate and said second plate each at least substantially consist of a metallic material;
    said elastomeric layer at least substantially consists of a strain-rate-sensitivity-hardening elastomeric material selected from the group consisting of polyurethane, polyurea, and a mixture of polyurea and polyurethane.

5. The armor system of claim 1, wherein said elastomeric layer is a strain-rate-sensitivity-hardening elastomeric layer, said strain-rate-sensitivity-hardening elastomeric layer being characterized by strain-rate-sensitivity hardening in the strain rate range of approximately $10^3$/second-$10^6$/second and being capable of undergoing strain-rate hardening under either or both of ballistic conditions and blast conditions.

6. The armor system of claim 5, wherein said electrical conductivity is sustained while at least one of said projectile and said plasma sheath is in contact with each of said first plate and said second plate.

7. The armor system of claim 5, wherein:
said first plate and said second plate each at least substantially consist of a metallic material;
said strain-rate-sensitivity-hardening elastomeric layer at least substantially consists of a polymeric material selected from the group consisting of polyurethane, polyurea, and a mixture of polyurea and polyurethane.

8. The armor system of claim 5, wherein said electrification of said projectile affects said projectile by causing at least one of:
decrease in speed of said projectile;
change of direction of said projectile;
degradation of said projectile.

9. The armor system of claim 5, wherein said strain-rate-sensitivity-hardening elastomeric layer affects said projectile by causing at least one of:
decrease in speed of said projectile;
change of direction of said projectile;
degradation of said projectile.

10. The armor system of claim 9, wherein said affecting of said projectile by said strain-rate-sensitivity-hardening elastomeric layer increases the time during which said at least a portion of said projectile is situated between said first plate and said second plate, thereby increasing the time during which said closure of said electrical circuit is effected.

11. The armor system of claim 10, wherein in said time during which said closure of said electrical circuit is effected, each of said electrification and said strain-rate-sensitivity-hardening elastomeric layer affects said projectile by causing at least one of said decrease in speed of said projectile, said change of direction of said projectile, and said degradation of said projectile.

12. The armor system of claim 11, wherein said electrification is sustained while at least one of said projectile and said plasma sheath is in contact with each of said first plate and said second plate.

13. The armor system of claim 12, wherein:
said first plate and said second plate each at least substantially consist of a metallic material;
said strain-rate-sensitivity-hardening elastomeric layer at least substantially consists of a polymeric material selected from the group consisting of polyurethane, polyurea, and a mixture of polyurea and polyurethane.

14. The armor system of claim 1, wherein said elastomeric layer is a first said elastomeric layer and said electrical circuit is a first said electrical circuit, the armor system further comprising a third rigid electrically conductive plate and a second said elastomeric layer between said second plate and said third plate, said electrical power supply being electrically connected to said second plate and said third plate so as to form a second said electrical circuit, the second said electrical circuit being open between said second plate and said third plate, wherein electrification is effected, upon closure of the second said electrical circuit, of a moving projectile that penetrates said second plate so that at least a portion of said projectile is situated in the second said elastomeric layer, said closure of the second said electrical circuit being effected upon establishment, between said second plate and said third plate, of electrical connectivity via at least one of said projectile and a plasma sheath, said plasma sheath at least partially enveloping said projectile and being thermally generated in the second said elastomeric layer in association with friction of the second said elastomeric layer with said at least a portion of said projectile that is situated in the second said elastomeric layer.

15. An armor system comprising a composite laminate and an electrical power supply, said composite laminate including at least two metallic layers and at least one strain-rate-sensitivity-hardening elastomeric layer, each said metal layer being electrically connected to said electrical power supply, each said strain-rate-sensitivity-hardening elastomeric layer being sandwiched between two said metallic layers, each said strain-rate-sensitivity-hardening elastomeric layer being characterized by strain-rate-sensitivity hardening in the strain rate range of approximately $10^3$/second-$10^6$/second, each said strain-rate-sensitivity-hardening elastomeric layer being capable of undergoing strain-rate hardening under ballistic and/or explosive conditions involving at least partial penetration of said strain-rate-sensitivity-hardening elastomeric layer by at least one projectile, wherein each said penetrative projectile is caused to become at least partially surrounded by a plasma sheath due to friction-induced heating of a portion of said strain-rate-sensitivity-hardening elastomeric layer, and wherein electricity from said electrical power supply is caused to be conducted through said penetrative projectile due to electrical connection of said penetrative projectile and/or said plasma sheath with the two said metallic layers that sandwich said strain-rate-sensitivity-hardening elastomeric layer.

16. The armor system of claim 15, wherein said electricity that is caused to be conducted through said penetrative projectile influences said penetrative projectile in at least one respect selected from the following:
reducing the speed of said penetrative projectile;
changing the direction of said penetrative projectile;
degrading said projectile.

17. The armor system of claim 15, wherein said strain-rate-sensitivity-hardening elastomeric layer influences said penetrative projectile in at least one respect selected from the following:
reducing the speed of said penetrative projectile;
changing the direction of said penetrative projectile;
degrading said projectile.

18. The armor system of claim 17, wherein said influencing of said penetrative projectile by said strain-rate-sensitivity-hardening elastomeric layer increases the time of said at least partial penetration of said strain-rate-sensitivity-hardening elastomeric layer by said penetrative projectile, thereby increasing the time during which said electricity from said electrical power supply is caused to be conducted through said penetrative projectile.

19. The armor system of claim 18, wherein said electricity that is caused to be conducted through said penetrative projectile influences said penetrative projectile in at least one respect selected from the following:
reducing the speed of said penetrative projectile;
changing the direction of said penetrative projectile;
degrading said projectile.

20. The armor system of claim 19, wherein said strain-rate-sensitivity-hardening elastomeric layer and said electricity that is caused to be conducted through said penetrative projectile act in concert so as to influence said penetrative projectile in said at least one respect.

* * * * *